United States Patent
Chae

(10) Patent No.: US 11,421,610 B2
(45) Date of Patent: Aug. 23, 2022

(54) ARTIFICIAL INTELLIGENCE APPARATUS FOR CONTROLLING AUTO STOP SYSTEM AND METHOD THEREFOR

(71) Applicant: LG ELECTRONICS INC., Seoul (KR)

(72) Inventor: Jonghoon Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 539 days.

(21) Appl. No.: 16/490,511

(22) PCT Filed: Mar. 11, 2019

(86) PCT No.: PCT/KR2019/002792
§ 371 (c)(1),
(2) Date: Aug. 30, 2019

(87) PCT Pub. No.: WO2020/184747
PCT Pub. Date: Sep. 17, 2020

(65) Prior Publication Data
US 2021/0355884 A1 Nov. 18, 2021

(51) Int. Cl.
*F02D 35/02* (2006.01)
*B60K 35/00* (2006.01)
(Continued)

(52) U.S. Cl.
CPC ............ *F02D 35/028* (2013.01); *B60K 35/00* (2013.01); *F02N 11/0814* (2013.01);
(Continued)

(58) Field of Classification Search
CPC ............. F02N 11/0814; F02N 11/0837; F02N 99/002; F02D 41/1405; F02D 2041/1433
See application file for complete search history.

(56) References Cited

U.S. PATENT DOCUMENTS

2011/0061628 A1* 3/2011 Fujita ................ F02D 35/023
123/406.47
2011/0106413 A1 5/2011 Park et al.
(Continued)

FOREIGN PATENT DOCUMENTS

CN 106428008 2/2017
JP 2013036384 2/2013
(Continued)

OTHER PUBLICATIONS

PCT International Application No. PCT/KR2019/002792, Written Opinion of the International Searching Authority dated Dec. 6, 2019, 8 pages.

*Primary Examiner* — Phutthiwat Wongwian
*Assistant Examiner* — Anthony L Bacon
(74) *Attorney, Agent, or Firm* — Lee, Hong, Degerman, Kang & Waimey PC

(57) ABSTRACT

Disclosed is an artificial intelligence apparatus for controlling an auto stop function. The artificial intelligence apparatus includes an input unit configured to receive at least one of image information on surroundings of a vehicle, sound information on the surroundings of the vehicle, brake information of the vehicle, or velocity information of the vehicle; a storage unit configured to store an auto stop function control model; and a processor configured to obtain, via the input unit, input data related to at least one of traffic information or driving information, obtain base data used for determining control of the auto stop function from the input data, determine an engine ignition timing or an engine ignition setting using the base data and the auto stop function control model, and ignite the engine of the vehicle automatically according to the determined engine ignition timing or the determined of engine ignition setting, wherein the engine ignition timing is an indication of how much time is required for the engine to be ignited after the input data is (Continued)

obtained or after the time of the determination, and wherein the engine ignition setting is an indication of whether to ignite the engine at the time of acquiring the input data or at the time of the determination.

15 Claims, 12 Drawing Sheets

(51) Int. Cl.
<table>
<tr><td>G05B 13/02</td><td>(2006.01)</td></tr>
<tr><td>F02N 11/08</td><td>(2006.01)</td></tr>
<tr><td>F02N 99/00</td><td>(2010.01)</td></tr>
<tr><td>F02D 41/14</td><td>(2006.01)</td></tr>
</table>

(52) U.S. Cl.
CPC ........ *F02N 11/0837* (2013.01); *F02N 99/002* (2013.01); *G05B 13/027* (2013.01); *F02D 2041/1433* (2013.01)

(56) References Cited

U.S. PATENT DOCUMENTS

<table>
<tr><td>2012/0010045 A1*</td><td>1/2012</td><td>Nedorezov ........... B60W 10/10<br>477/79</td></tr>
<tr><td>2012/0143469 A1</td><td>6/2012</td><td>Gwon et al.</td></tr>
<tr><td>2013/0035839 A1*</td><td>2/2013</td><td>Otanez ................ F02N 11/0837<br>701/102</td></tr>
<tr><td>2015/0175149 A1</td><td>6/2015</td><td>Zhao et al.</td></tr>
<tr><td>2015/0239450 A1*</td><td>8/2015</td><td>Yu ....................... F02N 11/0837<br>701/70</td></tr>
<tr><td>2016/0318523 A1*</td><td>11/2016</td><td>Kim .......................... B60R 1/00</td></tr>
<tr><td>2019/0178183 A1*</td><td>6/2019</td><td>Hu ........................ F02D 41/042</td></tr>
<tr><td>2019/0360446 A1*</td><td>11/2019</td><td>Chae .................... G05D 1/0088</td></tr>
</table>

FOREIGN PATENT DOCUMENTS

<table>
<tr><td>KR</td><td>101378037</td><td>3/2014</td></tr>
<tr><td>KR</td><td>101628399</td><td>6/2016</td></tr>
<tr><td>KR</td><td>1020170033612</td><td>3/2017</td></tr>
<tr><td>KR</td><td>1020170060434</td><td>6/2017</td></tr>
</table>

* cited by examiner

FIG. 7

| SECTION INFORMATION | SIGNAL INFORMATION | BRAKE LIGHT OF PRECEDING VEHICLE | ENGINE IGNITION SETTING |
|---|---|---|---|
| Congested | Green | On | Non-ignition |
| | | Off | Ignition |
| | Red | On | Non-ignition |
| | | Off | Non-ignition |
| Slow | Green | On | Non-ignition |
| | | Off | Ignition |
| | Red | On | Non-ignition |
| | | Off | Ignition |
| Smooth | Green | On | Ignition |
| | | Off | Ignition |
| | Red | On | Non-ignition |
| | | Off | Ignition |

- : SMOOTH SECTION
- : SLOW SECTION
- : CONGESTED SECTION
- : GREEN LIGHT
- : RED LIGHT
- : ENGINE IGNITION
- : ENGINE NON-IGNITION

FIG. 8

| PATTERN | CURRENT TRAFFIC VOLUME INFORMATION | TRAFFIC VOLUME INFORMATION AT FIRST PREVIOUS TIME POINT | CURRENT SIGNAL INFORMATION | SIGNAL INFORMATION AT FIRST PREVIOUS TIME POINT | CURRENT VEHICLE VELOCITY | VEHICLE VELOCITY AT FIRST PREVIOUS TIME POINT | CURRENT VELOCITY OF PRECEDING VEHICLE | VELOCITY OF PRECEDING VEHICLE AT FIRST PREVIOUS TIME POINT | USER FEEDBACK |
|---|---|---|---|---|---|---|---|---|---|
| PATTERN 1 | | | | | | | | | ENGINE IGNITION |
| PATTERN 2 | | | | | | | | | ENGINE NON-IGNITION |
| PATTERN 3 | | | | | | | | | ENGINE IGNITION |
| PATTERN 4 | | | | | | | | | ENGINE IGNITION |
| ... | | | | | | | | | |

FIG. 9

| ASSOCIATION RULE | CURRENT TRAFFIC VOLUME INFORMATION | TRAFFIC VOLUME INFORMATION AT FIRST PREVIOUS TIME POINT | CURRENT SIGNAL INFORMATION | SIGNAL INFORMATION AT FIRST PREVIOUS TIME POINT | CURRENT VEHICLE VELOCITY | VEHICLE VELOCITY AT FIRST PREVIOUS TIME POINT | CURRENT VELOCITY OF PRECEDING VEHICLE | VELOCITY OF PRECEDING VEHICLE AT FIRST PREVIOUS TIME POINT | ENGINE IGNITION SETTING |
|---|---|---|---|---|---|---|---|---|---|
| ASSOCIATION RULE 1 | ▨ | | ▨ | | | ▨ | | | ◉ |
| ASSOCIATION RULE 2 | ▨ | | ▨ | | ▨ | | ▨ | | ◌ |
| ASSOCIATION RULE 3 | ▨ | ▨ | | | | | ▨ | | ◉ |
| ASSOCIATION RULE 4 | | | | ▨ | ▨ | | ▨ | | ◌ |
| ... | | | | | | | | | |

◉ : ENGINE IGNITION
◌ : ENGINE NON-IGNITION

ARTIFICIAL INTELLIGENCE APPARATUS FOR CONTROLLING AUTO STOP SYSTEM AND METHOD THEREFOR

CROSS-REFERENCE TO RELATED APPLICATIONS

This application is the National Stage filing under 35 U.S.C. 371 of International Application No. PCT/KR2019/002792, filed on Mar. 11, 2019, the contents of which are hereby incorporated by reference herein in its entirety.

BACKGROUND OF THE INVENTION

1. Field of the Invention

The present invention relates to an artificial intelligence device for controlling an auto stop system and a method thereof. In particular, an artificial intelligence apparatus and method for determining when to ignite an engine stopped by an auto stop system based on at least one of traffic information or driving information, and automatically igniting the engine according to the determined engine ignition timing.

2. Discussion of the Related Art

An auto stop system or an idle stop & go system is a system mounted on a vehicle, which stops an engine when the vehicle is stopped.

In the case in which the auto stop system is mounted on the vehicle, there is an effect of reducing fuel waste and pollution caused by engine idling occurring when the vehicle is stopped. Also, since an engine idling sound is not generated when the vehicle is stopped, it may be possible to well listen to the outside sound of the vehicle, thereby effectively preventing safety accidents that occurs due to other vehicles or persons outside the vehicle from occurring.

However, the existing auto stop system stops the engine when the vehicle stops and ignites the engine again when a user releases a brake pedal or presses an engine pedal to start the vehicle, thereby causing a problem that the vehicle is delayed by a certain time from the actual stop to departure.

PRIOR ART

Patent Document

Korean Registered Patent No. 10-1628399

SUMMARY OF THE INVENTION

The present invention provides an artificial intelligence apparatus and a method for automatically igniting an engine stopped by an auto stop system mounted on a vehicle based on traffic information and driving information indicating a current driving status of the vehicle without a user's separate operation.

In addition, the present invention provides an artificial intelligence apparatus and a method for controlling an auto stop system, which may control the auto stop system personalized for each user by reflecting a user's feedback on determination to automatically ignite the engine.

An embodiment of the present invention provides an artificial intelligence apparatus and a method for obtaining traffic information and driving information representing the current driving situation of a vehicle, determining an engine ignition timing or an engine ignition setting for automatically igniting an engine when the engine is stopped automatically by an auto stop system due to stopping of the vehicle and igniting the engine according to the determined engine ignition timing or engine ignition setting.

In addition, an embodiment of the present invention provides an artificial intelligence apparatus and a method for using a control model personalized for each vehicle or user, generating training data for update used to update an auto stop system control model by obtaining a user's feedback as to an engine ignition timing or an engine ignition setting determined in the control model, determining the engine ignition timing or the engine ignition setting using the updated auto stop system control model by using the training data for update, and igniting the engine according to the determined engine ignition timing or the engine ignition setting.

According to the various embodiments of the present invention, when an engine is stopped by an auto stop system due to stopping of a vehicle, the engine is automatically ignited at a suitable time point that is determined that the likelihood of starting automatically is high even when the user does not perform a separate operation for starting, thereby resolving the problem of delayed departure of the vehicle and reducing the fatigue of the user.

In addition, according to the various embodiments of the present disclosure, the user's satisfaction or preference with respect to the time of automatically igniting the engine stopped by the auto stop system determined by the auto stop system control model is determined, and the user's satisfaction or preference By determining the engine ignition time by using the updated auto stop system control model reflecting this, it is possible to provide a personalized engine auto ignition function with high satisfaction for each user.

BRIEF DESCRIPTION OF THE DRAWINGS

FIG. 7 is a view illustrating an example of a rule-based control model according to an embodiment of the present invention.

FIG. 8 is a view illustrating an example of a format of data used for an associative rule analysis according to an embodiment of the present invention.

FIG. 9 is a view illustrating an example of an associative rule generated depending on the associative rule analysis according to an embodiment of the present invention.

DETAILED DESCRIPTION OF THE PREFERRED EMBODIMENTS

Figure 1:
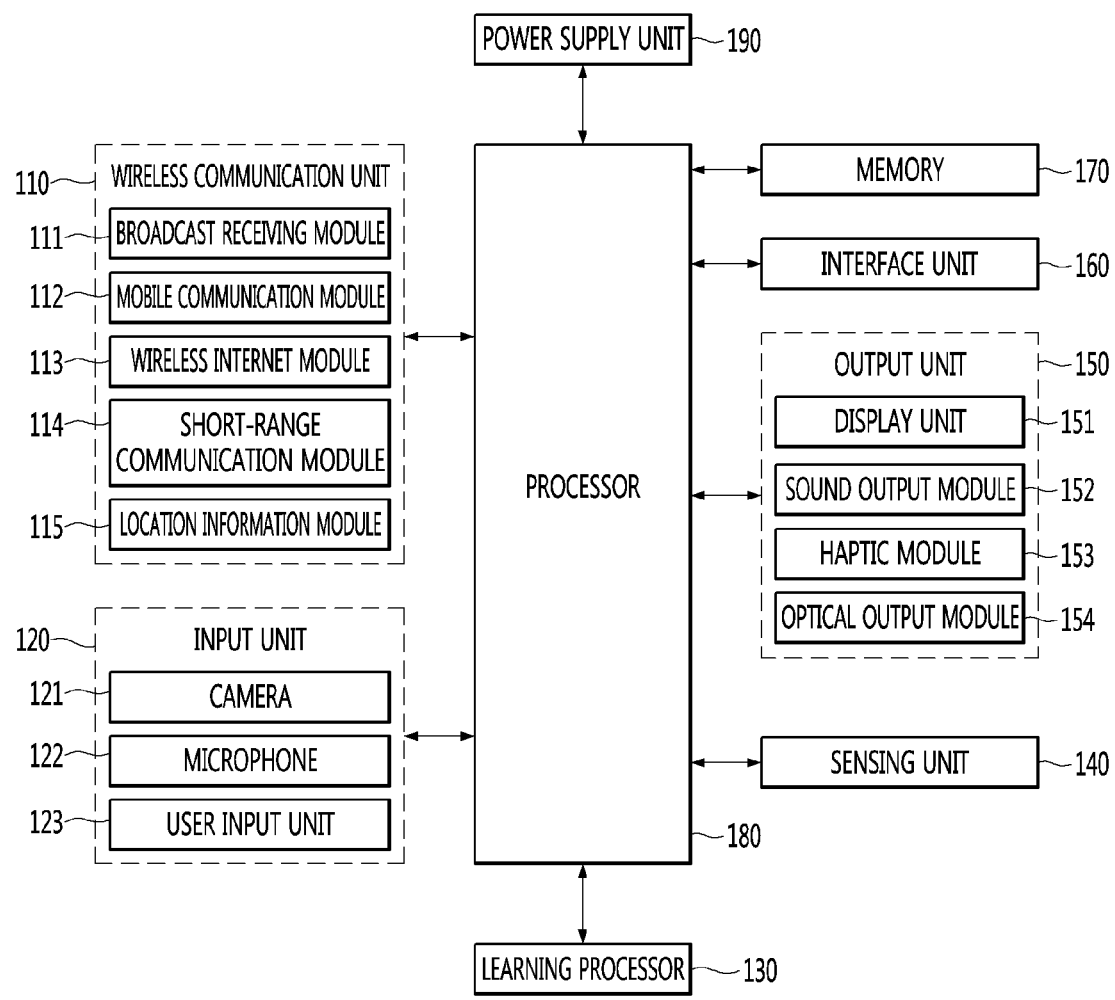
FIG. 1 is a block diagram illustrating a configuration of a control device for an auto stop system according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network may be specified in structure by a configuration of a model, an activation function, a loss function, or a cost function, a learning algorithm, an optimization algorithm, and the like. A hyperparameter may be set in advance before the learning, and then, a model parameter may be set through the learning to specify contents thereof.

For example, factors that determine the structure of the artificial neural network may include the number of hidden layers, the number of hidden nodes included in each of the hidden layers, an input feature vector, a target feature vector, and the like.

The hyperparameter includes various parameters that have to be initially set for learning such as an initial value of the model parameter. Also, the model parameter includes various parameters to be determined through the learning.

For example, the hyperparameter may include an initial weight value between the nodes, an initial bias between the nodes, a mini-batch size, the number of learning repetition, a learning rate, and the like. Also, the model parameter may include a weight between the nods, a bias between the nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

Here, the step size may mean the learning rate.

In the GD, a gradient may be acquired by partially differentiating the loss function into each of the model parameters, and the model parameters may be updated by changing the model parameters by the learning rate in a direction of the acquired gradient.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

Hereinafter, the control of the auto stop system may be understood as controlling the auto stop function. Thus, the control device for the auto stop system and the control device for the auto stop function may be commonly used in the same meaning, and the control method for the auto stop system and the control method for the auto stop function may be commonly used in the same meaning.

Also, the control model for the auto stop system and the control model for the auto stop function may be commonly used in the same meaning.

FIG. 1 is a block diagram illustrating a configuration of the control device 100 for the auto stop system according to an embodiment of the present invention.

Hereinafter, the control device 100 for the auto stop system may be called a terminal 100.

The terminal 100 may be implemented for a TV, a projector, a mobile phone, a smart phone, a laptop computer, a digital broadcasting terminal, a personal digital assistant (PDA), a portable multimedia player (PMP) a slate PC, a tablet PC, an ultrabook, a wearable device (for example, a smartwatch, a smart glass, a head mounted display (HMD)), a set-top box (STB), a DMB receiver, a radio, a washing machine, a refrigerator, a desktop computer, fixed equipment such as a digital signage, movable equipment, and the like.

That is, the terminal device 100 may be implemented as various appliances that are used at home, and may be applied to a fixed or movable robot.

Particularly, the terminal 100 may be implemented as a navigation and multimedia device mounted on the vehicle. Furthermore, the terminal 100 may be implemented as an apparatus connected to an electronic control unit (ECU) of the vehicle or including an electronic control unit.

The terminal device 100 can perform a function of a voice agent. The voice agent may be a program that recognizes voice of a user and output a response suitable for the recognized user's voice using voice.

Referring to FIG. 1, the terminal 100 may include a wireless communication unit 110, an input unit 120, a learning processor 130, a sensing unit 140, an output unit 150, an interface unit 160, a memory 170, a processor 180, and a power supply unit 190.

The trained model may be mounted on the terminal 100.

The trained model may be implemented as hardware, software, or a combination of the hardware and the software. When a portion or the whole of the trained model is implemented as the software, one or more commands constituting the trained model may be stored in the memory 170.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

The input unit 120 may acquire training data for the model learning and input data to be used when an output is acquired using the trained model.

The input unit 120 may acquire input data that is not processed. In this case, the processor 180 or the learning processor 130 may preprocess the acquired data to generate training data that is capable of being inputted into the model learning or preprocessed input data.

Here, the preprocessing for the input data may mean extracting of an input feature from the input data.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 learns a model provided as the artificial neural network by using the training data.

Particularly, the learning processor 130 may determine optimized model parameters of the artificial neural network by repeatedly learning the artificial neural network by using the above-described various learning techniques.

In this specification, since the artificial neural network is learned by using the training data, the artificial neural network of which the parameters are determined may be called a learned model or a trained model.

Here, the trained model may be used to infer results for new input data rather than training data.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine. Here, the database may be implemented using a memory 170, a memory 230 of the learning device 200, a memory maintained under cloud computing environments, or other remote memory locations that are accessible by the terminal through a communication scheme such as a network.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technology, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The memory 170 may store a model that is learned in the learning processor 130 or the learning device 200.

Here, the memory 170 may store the learned model into a plurality of versions according to a learning time point, a learning progress, and the like.

Here, the memory 170 may store the input data acquired by the input unit 120, the learning data (or the training data) used for the model learning, a learning history of the model, and the like.

Here, the input data stored in the memory 170 may be input data itself, which is not processed, as well as data that is processed adequate for the model learning.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

The power supply unit 190 may receive external power or internal power under a control of the processor 180 and may then supply power to each component in the mobile terminal 100. The power supply unit 190 includes a battery and the battery may be a built-in battery or a replaceable battery.

Figure 2:
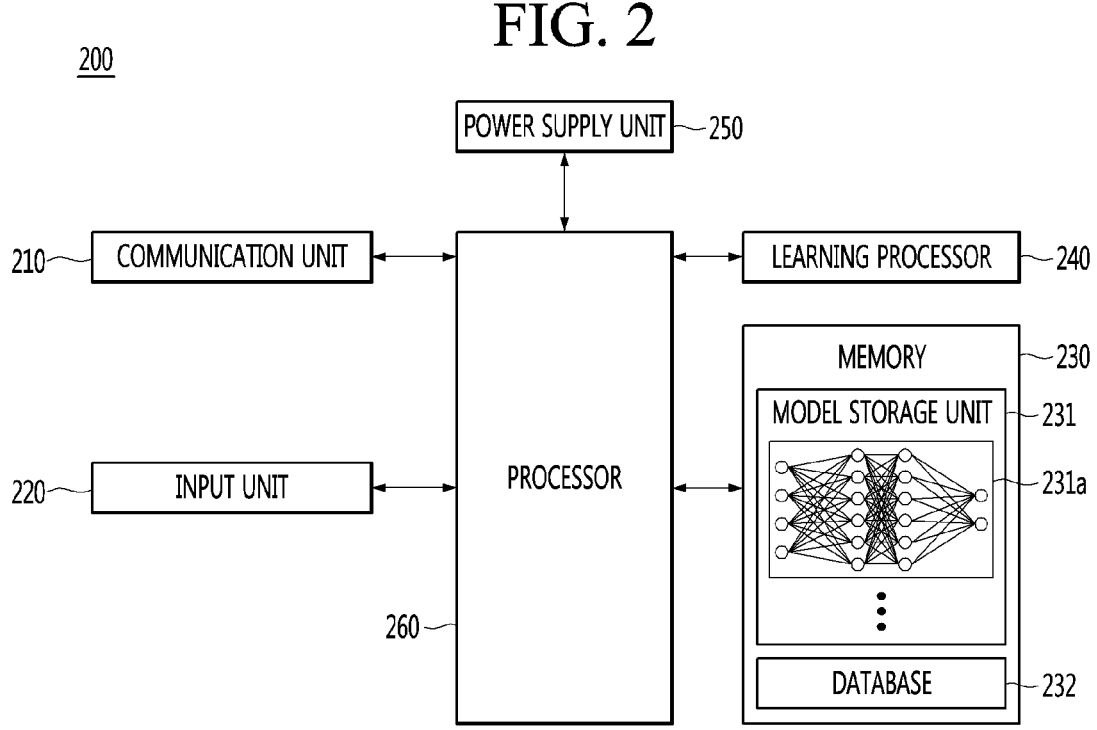
FIG. 2 is a block diagram illustrating a configuration of a learning device of an artificial neural network according to an embodiment of the present invention.

FIG. 2 is a block diagram illustrating a configuration of a learning device 200 of an artificial neural network according to an embodiment of the present invention.

The learning device 200 may be a device or server that is separately provided outside the terminal 100 and perform the same function as the learning processor 130 of the terminal 100.

That is, the learning device 200 may be configured to receive, classify, store, and output information to be used for data mining, data analysis, intelligent decision making, and machine learning algorithm. Here, the machine learning algorithm may include a deep learning algorithm.

The learning device 200 may communicate with at least one terminal 100 and analyze or train the data instead of the terminal 100 or by assisting the terminal 100 to derive results. Here, the assisting for the other devices may mean distribution of computing power through distribution processing.

The learning device 200 for the artificial neural network may be a variety of apparatuses for learning an artificial neural network and may be generally called a server or called a learning device or a learning server.

Particularly, the learning device 200 may be implemented not only as a single server but also as a plurality of server sets, a cloud server, or a combination thereof.

That is, the learning device 200 may be provided in a plurality to constitute the learning device set (or the cloud server). At least one or more learning device 200 included in the learning device set may analyze or train data through the distribution processing to derive the result.

The learning device 200 may transmit the model that is learned by the machine learning or the deep learning to the terminal periodically or by demands.

Referring to FIG. 2, the learning device 200 may include a communication unit 210, an input unit 220, a memory 230, a learning processor 240, a power supply unit 250, a processor 260, and the like.

The communication unit 210 may correspond to a constituent including the wireless communication unit 110 and the interface unit 160 of FIG. 1. That is, the communication unit 210 may transmit and receive data to/from other devices through wired/wireless communication or an interface.

The input unit 220 may be a constituent corresponding to the input unit 120 of FIG. 1 and may acquire data by receiving the data through the communication unit 210.

The input unit 220 may acquire training data for the model learning and input data for acquiring an output by using the trained model.

The input unit 220 may acquire input data that is not processed. In this case, the processor 130 may preprocess the acquired data to generate training data that is capable of being inputted into the model learning or preprocessed input data.

Here, the preprocessing for the input data, which is performed in the input unit 220, may mean extracting of an input feature from the input data.

The memory 230 is a constituent corresponding to the memory 170 of FIG. 1.

The memory 230 may include a model storage unit 231 and a database 232.

The model storage unit 231 may store a model being learned or a learned model (or an artificial neural network 231a) through the learning processor 240 to store the updated model when the model is updated through the learning.

Here, the model storage unit 231 may store the trained model into a plurality of versions according to a learning time point, a learning progress, and the like.

The artificial neural network 231a illustrated in FIG. 2 may be merely an example of the artificial neural network including a plurality of hidden layers, and the artificial neural network of the present invention is not limited thereto.

The artificial neural network 231a may be implemented as hardware, software, or a combination of the hardware and the software. When a portion or the whole of the artificial neural network 231a is implemented as the software, one or more commands constituting the artificial neural network 231a may be stored in the memory 230.

The database 232 may store the input data acquired by the input unit 220, the learning data (or the training data) used for the model learning, a learning history of the model, and the like.

The database 232 stored in the memory 232 may be input data itself, which is not processed, as well as data that is processed adequate for the model learning.

The learning processor 240 is a constituent corresponding to the learning processor 130 of FIG. 1.

The learning processor 240 may train (or learn) the artificial neural network 231a by using the training data or the training set.

The learning processor 240 may directly acquire the processed data of the input data acquired through the input unit 220 to train the artificial neural network 231a or acquire the processed input data stored in the database 232 to train the artificial neural network 231a.

Particularly, the learning processor 240 may determine optimized model parameters of the artificial neural network 231a by repeatedly learning the artificial neural network 231a by using the above-described various learning techniques.

In this specification, since the artificial neural network is learned by using the training data, the artificial neural network of which the parameters are determined may be called a learned model or a trained model.

Here, the trained model may infer a result value in a state in which the trained model is installed on the learning device 200 or may be transmitted to the other device such as the terminal 100 through the communication unit 210 so as to be mounted.

Also, when the trained model is updated, the updated trained model may be transmitted to the other device such as the terminal 100 through the communication unit 210 so as to be mounted.

The power supply unit 250 is a constituent corresponding to the power supply unit 190 of FIG. 1.

Duplicated description with respect to the constituents corresponding to each other will be omitted.

Figure 3:
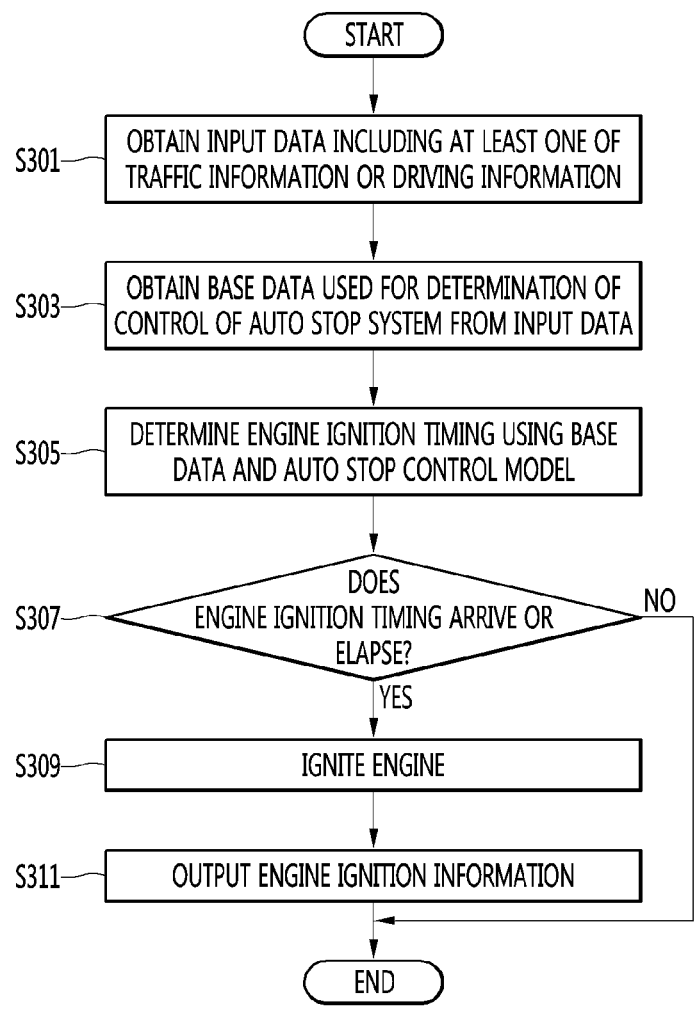
FIG. 3 is a flowchart illustrating a method for controlling the auto stop system according to an embodiment of the present invention.

FIG. 3 is a flowchart illustrating a method for controlling an auto stop system according to an embodiment of the present invention.

Referring to FIG. 3, a processor 180 of an auto stop system control apparatus 100 according to an embodiment of the present invention may obtain input data at least one of traffic information or driving information of a vehicle, through at least one or more of a wireless communication unit 110, an input unit 120, or an interface unit 160.

Hereinafter, the wireless communication unit 110 and the interface unit 160 may be collectively referred to as a communication unit. In addition, when the input unit 120 receives driving information through the interface unit 160, the input unit 120 may be referred to as a meaning encompassing the interface unit 160.

Here, the input data related to the traffic information may include traffic volume information, signal information, surrounding vehicle information, surrounding environment information, image information (vision information), sound information, or the like.

Here, the acquiring of the input data through the wireless communication unit 110 may mean receiving of data collected and transmitted by devices such as a navigation device and a black box device provided in the vehicle or data transmitted from other vehicles or traffic data management device through the wireless communication unit 110.

Here, the input unit 120 may obtain driving information from an ECU of the vehicle through the interface unit 160.

The processor 180 may obtain driving information of the vehicle continuously or periodically.

Here, the driving information may include collected time information (time stamps). Therefore, the driving information of the vehicle includes information on driving patterns.

Here, the traffic data management device may include a traffic data server or a navigation server for processing traffic-related data and may include various structures such as a signal light, a signal controller, and a beacon having communication functions to allow the traffic-related data to communicate with other devices.

For example, in a case where the signal light (smart signal or the like) having the communication function collects vehicle information on the road to transmit traffic volume information to nearby vehicles or transmit signal change information, etc., the traffic data management device may mean the signals.

Here, the acquiring of the input data through the interface unit 160 may mean receiving of data collected through the interface unit 160 such as the navigation device or the black box device provided in the vehicle.

Here, the nearby vehicle information acquired through the wireless communication unit 110 or the interface unit 160 may be vehicle information transmitted directly by other nearby vehicles.

Here, the processor 180 may receive the vehicle information directly from other nearby vehicles through the inter-vehicle communication through the wireless communication unit 110 or receive the vehicle information received from other nearby vehicles by the navigation device or the like connected through the interface unit 160 from the navigation device or the like, which is connected thereto.

That is, the processor 180 may acquire vehicle information from another vehicle through inter-vehicle communication using the wireless communication unit 110 and may acquire vehicle information about other vehicles collected directly by the traffic data management device or vehicle information, which is collected from information of other vehicles, from the traffic data management device by using the wireless communication unit 110.

Here, the input unit 120 may acquire video information around the vehicle through the camera 121 and acquire sound information around the vehicle through the microphone 122.

At least one or more cameras 121 may be provided to acquire at least one or more image information from the front, rear, or side of the vehicle, as occasion demands. For example, a front camera for illuminating the front of the vehicle and a rear camera for illuminating the rear of the vehicle, or a panoramic camera for illuminating all directions of 360 degrees.

The camera 121 may include an infrared region sensor as well as a visible ray region sensor and may acquire infrared ray image information as well as visible ray image information.

The processor 180 may use the visible light image information in the daytime and the infrared image information in the nighttime, but may use both of the image information without distinguishing between daytime and nighttime. For example, it may be possible to collect all the information acquired from the two pieces of image information or to use only the information acquired from the image information which is highly reliable in the two pieces of image information.

The camera 121 may include a depth sensor to acquire image information including depth information.

The microphone 121 may acquire sound information in a non-audible frequency range as well as sound information in an audible frequency range. For example, the sound information in the non-audible frequency range may include ultrasound.

The collected image information and sound information may be used to acquire the traffic volume information, the signal information and the peripheral environment information. The peripheral environment information may include information about the number of peripheral objects, a type of peripheral objects, a location of peripheral objects, and motion of the peripheral object.

The motion information of the peripheral objects may be acquired by analyzing the Doppler effect of the sound information or by analyzing the depth information of the image information.

Here, the traffic volume information, the signal information, the nearby vehicle information, and the peripheral traffic volume information may be acquired from other devices in a processed state, but at least one or more of the collected image information or sound information may be analyzed and acquired.

For example, the processor 180 may analyze at least one or more of the image information or the sound information to determine the number of nearby vehicles, locations of the nearby vehicles, the motion of the nearby vehicles, the driving state of the nearby vehicles (e.g., whether the brake light is turned on, whether the turn signal light is turned on, whether the emergency light is turned on), the lighting state of the peripheral signal lights, the number of peripheral objects, the location of peripheral objects, and the motion of peripheral objects.

The processor 180 of the auto stop system control apparatus 100 obtains base data used for the determination of the control of the auto stop system from the input data (S303).

The base data is data used to determine whether the auto stop system is activated, which is data obtained by processing the collected input data. That is, the base data is data preprocessed for easy analysis in such a manner that information not quantified in the driving information are digitized according to a predetermined criterion, and the digitized values are normalized when necessary.

Here, a process of acquiring the base data may mean a process of extracting an input feature vector from an artificial neural network model.

Here, the base data may include a congestion degree for each section, signal information for each section, and surrounding environment information.

Here, the congestion degree for each section may be expressed as the stage information and the continuous congestion degree.

For example, the congestion degree may be expressed in three stages such as "congestion", "slowness", and "smoothness" and may be expressed as a value between 0 and 100. Furthermore, it may also be represented by a representative value for labels such as "congestion", "slowness, and "smoothness". For example, the congestion degree may be expressed as a representative value such as "congestion" expressed as a value of "100", "slowness" expressed as a value of "50", and "smoothness" expressed as a value of "0".

Here, the congestion degree may be expressed as a value normalized between 0 and 1. For example, the congestion degree may be expressed as a representative value such as "congestion" expressed as a value of "1", "slowness" expressed as a value of "0.5", and "smoothness" expressed as a value of "0".

Here, the signal information may mean at least one or more of signal turn-on information and signal schedule information for a signal light.

For example, the signal information may be expressed by whether a green light of a nearest signal light included in a current driving section is currently turned on, whether the turn-on state changes after several seconds, or how many seconds later a red light turns on. Whether the green light is turned on or off may be expressed as "1" when turned on, or "0" when turned off, and the change time of the turn-on state may be expressed in seconds as the remaining time of the currently turn-on signal.

Here, the peripheral environment information may include the number, position, motion information, and the like of other objects currently existing around the vehicle.

For example, the peripheral environment information included in the base data may be expressed by the position, distance, velocity, whether the brake light is turned on, or the like of a vehicle nearest to the front.

In addition, the base data may include an input strength (or a degree of input), the number of inputs, an input interval, a change in the input strength, an previous input strength, a repetition degree, and the like of the brake pedal corresponding to brake information. In addition, the base data may include a current velocity, a section velocity, a velocity trend, a previous velocity and a deceleration degree, or the like of a vehicle corresponding to the velocity information of the vehicle.

Here, the input strength of the brake pedal may refer to the input strength at the current time (or when the driving information is collected), and the input strength may be expressed numerically to have a value within a predetermined range (for example, 0 to 1) such as a value between 0 and 1.

Figure 6:
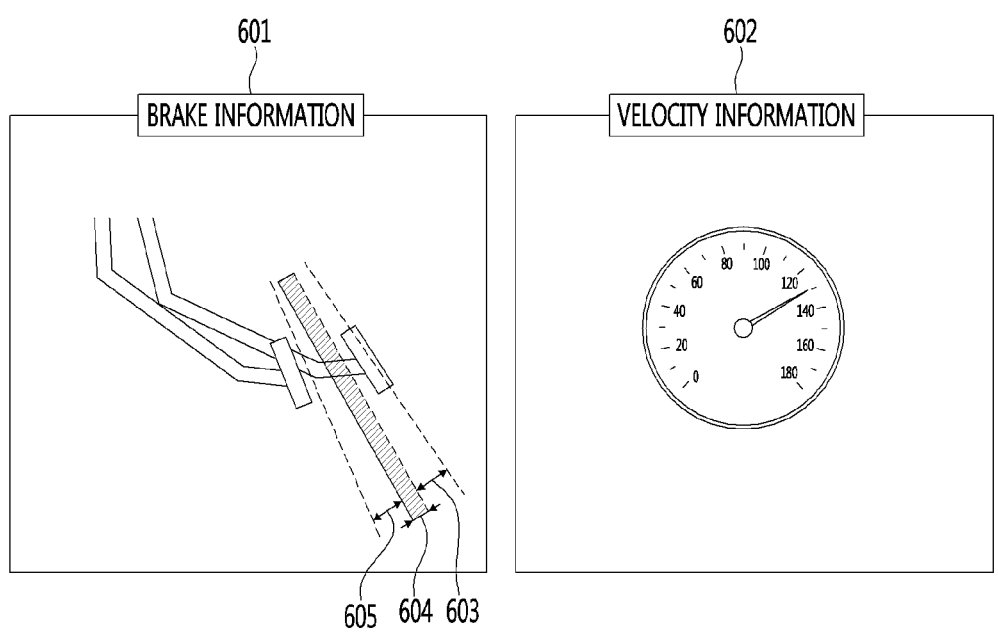

In addition, as shown in FIG. 6, the input strength of the brake pedal may further include pedal section information indicating whether an input of the brake pedal corresponds to a pedal play section 603, a fine braking section 604, or a rapid braking section 605, and may also be expressed by a predetermined numerical value. For example, the pedal section information may be expressed in numerical values according to a predetermined criterion such as 0 for the pedal play section, 0.5 for the fine braking section, and 1 for the rapid braking section.

The number of inputs of the brake pedal may mean the the number of inputs of the brake pedal for a predetermined period (e.g., 10 seconds).

The input interval of the brake pedal may mean a time interval between the input of a previous brake pedal and a current brake pedal input, and may be expressed in seconds.

Here, one input when the number of inputs or the input interval of the brake pedal is determined may mean a period during which the input is completely finished after the input of the brake pedal is started, or mean a period during which the input strength of the brake pedal increases and then decreases continuously.

For example, assuming that the input strength of the brake pedal is from 0 to 1, considering a case where the input strength of the brake pedal increases from 0 to 0.5, then decreases to 0.3, then increases to 0.6 and then decreases to 0; as there is only one section having an input strength of from 0 to 0, it may be determined as one input or, alternatively, as there is two sections in which the input strength increases and decreases, it may be determined as two inputs.

Here, the change in the input strength of the brake pedal may mean a change in the input strength in consideration of the input strength at a predetermined previous time point (for example, a time point earlier by 0.1 seconds) from the current time point.

Here, the input strength of the brake pedal at a previous time point may mean the input strength at a predetermined previous time point (e.g., earlier by 0.1 seconds or the like). In addition, the input strength of the brake pedal at the previous time point may mean not only the input strength of a single previous time, but also the input strength at a plurality of previous time points (for example, earlier by 0.1 seconds, 0.2 seconds, or 0.3 seconds).

Here, the current velocity of the vehicle may mean the current input strength (at a time point at which the driving information is collected) and may be expressed in units of velocity such as km/h.

The section velocity of the vehicle may mean the average velocity of the vehicle for a predetermined time (for example, 10 seconds) or for a predetermined section (for example, 100 m), and may be expressed in units of velocity such as km/h.

A change in the velocity of the vehicle may mean a change in the vehicle velocity in consideration of the velocity of the vehicle at a predetermined previous time point (for example, earlier by 0.1 seconds) from the current time point.

Here, the velocity of the vehicle at the previous time point may mean the velocity of the vehicle at a predetermined previous time point (for example, earlier by 0.1 seconds), and may be expressed in units of velocity such as km/h. In addition, the velocity of the vehicle at the previous time point may mean not only a velocity at a single previous time point, but also velocities at a plurality of previous time points (e.g., for example, earlier by 0.1 seconds, 0.2 seconds, 0.3 seconds or the like)

Here, the base data may include information for each section or period. For example, the base data may include information indicating that a predetermined period for the number of inputs of the brake pedal is 10 seconds and a previous time point considered in the change in the input strength of the brake pedal is a time point earlier by 0.1 seconds, or the like.

In addition, the base data may include a section setting criterion corresponding to traffic volume information, a congestion degree for each section, signal information, surrounding environment information, and the like.

Here, the traffic volume information included in the base data may be a section having a predetermined distance (for example, 50 meters, 100 meters, etc.) from a current moving line from the current position or may be a section from the current position to the signal light having the predetermined number (e.g., one, two, etc.). That is, the traffic volume information section may be a section from the current position to 100 meters in the moving line or a section from the current position to the next signal light, and the like.

Here, the traffic volume information included in the base data may be composed of traffic volume information corresponding to a plurality of sections. That is, the base data may include respective two or more pieces of traffic volume information in two or more sections.

For example, if it is assumed that the first section is a section from the current position to a front 50 meters (or just after the signal light) on the moving line, and a second section is a section from a forward 50 meters (or just after the signal light), the base data may include traffic volume information corresponding to the first section and traffic volume information corresponding to the second section.

Here, the base data may include information on how each section is set as a reference.

For example, information indicating whether the section is divided based on the distance, or whether the section is divided based on the position of the signal light may be included in the base data.

Here, base data may be included in place of the distance information of the section by acquiring the distance information to the corresponding signal light even if each section is divided by the position of the signal light.

For example, the base data may include the distance information of a specific section when dividing the section based on the distance and may include the distance information to the position of the target signal even when dividing the section based on the position of the signal light. Thus, there is an advantage in that the base data of the same unit is set even when the section is set.

Here, the congestion degree for each section may be expressed as the stage information and the continuous congestion degree.

The congestion degree may be expressed in three stages such as "congestion", "slowness", and "smoothness" and may be expressed as a value between 0 and 100. Furthermore, it may also be represented by a representative value for labels such as "congestion", "slowness, and "smoothness". For example, the congestion degree may be expressed as a representative value such as "congestion" expressed as a value of "100", "slowness" expressed as a value of "50", and "smooth" expressed as a value of "0".

Here, the congestion degree may be expressed as a value normalized from 0 to 1 For example, the congestion degree may be expressed as a representative value such as "congestion" expressed as a value of "1", "slowness" expressed as a value of "0.5", and "smooth" expressed as a value of "0".

Here, the signal information may mean at least one or more of signal turn-on information and signal schedule information for the signal light.

For example, the signal information may be expressed by whether the current green light of the nearest signal light included in the current driving section is turned on, whether the turn-on state changes after several seconds, or that the red light is turned on after several seconds. Whether the green light is turned on may be expressed as "1" when turned on, or "0" when turned off, and the change time of the turned on state may be expressed in seconds as the remaining time of the currently turn-on signal.

Here, the peripheral environment information may include the number, position, motion information, and the like of other objects around the current vehicle.

For example, the peripheral environment information included in the base data may be expressed by the position, distance, velocity, brake, etc., of the vehicle nearest to the front, whether the brake light is turned on, or the like.

Tables 1 and 2 below show examples of the base data, and each column represents the base data for situations that are independent of each other.

TABLE 1

|  | Base data 1 | Base data 2 | Base data 3 |
| --- | --- | --- | --- |
| Section(m) | 50 | 30 | 25 |
| Traffic volume information(0~1) | smooth(0) | slow(0.5) | 0.7 |
| Whether green light is turned on(0 or 1) | 1 | 0 | 1 |
| Remaining time of the currently turn-on signal(s) | 20 | 10 | 15 |
| Distance to preceding vehicle(m) | 40 | 20 | 15 |
| Whether brake light of preceding vehicle is turned on(0 or 1) | 0 | 1 | 1 |
| Brake pedal input strength | 0.5 | 0.2 | 0.9 |
| Pedal section information | 0.5(fine braking section) | 0(pedal play section) | 1(rapid braking section) |
| Number of inputs of brake pedal | 3 | 1 | 2 |
| Brake pedal input interval(s) | 5 | 1 | 10 |
| Brake pedal input strength at first previous time point | 0.4 | 0.15 | 0.3 |
| Current velocity(km/h) | 35 | 20 | 60 |
| Section velocity(km/h) | 38 | 23 | 85 |
| Velocity at first previous time point(km/h) | 38 | 22 | 90 |

TABLE 2

|  | Base data 4 | Base data 5 | Base data 6 |
| --- | --- | --- | --- |
| Section(m) | 50 | 30 | 25 |
| Traffic volume information(0~1) | smooth(0) | slow(0.5) | 0.7 |
| Whether green light is turned on(0 or 1) | 1 | 0 | 1 |
| Remaining time of the currently turn-on signal(s) | 20 | 10 | 15 |
| Distance to preceding vehicle(m) | 40 | 20 | 15 |
| Whether brake light of preceding vehicle is turned on(0 or 1) | 0 | 1 | 1 |
| Brake pedal input strength | 0.5 | 0.2 | 0.9 |
| Pedal section information | 0.5(fine braking section) | 0(pedal play section) | 1(rapid braking section) |
| Current velocity(km/h) | 35 | 20 | 60 |

Table 1 is an example of base data configured to include traffic information and vehicle driving information at a previous time point as well as traffic information and vehicle driving information at a time point when data is collected. The base data having this structure may be used when the auto stop function control model is a rule-based model or an artificial neural network-based model having the structure of a general multilayer neural network.

Table 2 is an example of the base data composed of only traffic information and vehicle driving information at the time point when data is collected. The base data of this structure may be used when the auto stop function control model is composed of an artificial neural network-based model having the structure of a recurrent neural network (RNN).

The base data may be processed and expressed as numerical values as shown in Table 1 and Table 2 in order to be used for determining the control of the auto stop system. That is, when the information included in the base data is clearly expressed in numerical values such as the distance and time, it may be expressed according to a predetermined unit (for example, a unit of the distance is meter, and a unit of the time is second). When the units are not provided such as whether the light is turned on or the traffic volume, the information may be expressed as a value between 0 and 1 according to the predetermined standard.

The processor 180 of the auto stop system control apparatus 100 determines an engine ignition timing or an engine ignition setting by using the base data and the auto stop system control model (S305).

Here, the engine ignition timing may mean how much time is required for the engine to be ignited after a time point when the input data is obtained or when the engine ignition timing is determined in a state in which the auto stop function is activated and the engine is stopped due to the stop of the vehicle.

For example, the engine ignition timing may be expressed in time-point information a time from the timing of acquiring the input data or the time of determining the engine ignition to the ignition of the engine (for example, three seconds later), and determining the timing of acquiring the input data or the engine ignition It may be represented by time information (e.g., pm 13, 05, 45) in consideration of the viewpoint.

In addition, the engine ignition setting may mean whether to ignite the engine at the time point at which the input data is obtained or when the engine ignition setting is determined.

Here, the engine ignition timing or the engine ignition setting may indicate a time point at which the engine is ignited or whether to ignite the engine even when a driver (user) does not perform any special operation on a brake pedal or an accelerator pedal in a state where the engine is stopped due to the auto stop function while the vehicle is stopped. Therefore, when the user takes his foot off the brake pedal or presses the accelerator pedal in the state in which the vehicle is stopped, an electronic control unit of the vehicle may ignite the engine regardless of the determined engine ignition timing or the determined engine ignition setting.

Here, the auto stop system control model may be a personalized model set separately for each vehicle or each user.

Here, the control model for the auto stop system may mean either a rule-based control model for the base data or an artificial neural network-based control model learned by the machine learning algorithm.

Here, even when a driving pattern represented by the driving information is not explicitly outputted, the artificial neural network-based control model is learned by reflecting the driving pattern in the learning process. The reason for this is that temporal information is included in training data for learning of the artificial neural network-based control model.

Here, the artificial neural network-based control model may be a personalized model that is separately learned for each vehicle or each user.

That is, the artificial neural network-based control model is learned separately for each vehicle, and the processor 180 may use the artificial neural network-based control model corresponding to a current target vehicle. In addition, the artificial neural network-based control model is learned separately for each user, and the processor 180 may use an artificial neural network-based control model corresponding to a current target user.

The auto stop system control model may mean an association rule-based control model corresponding to the base data.

Here, the association rule-based control model may be understood as a subordinate concept of the rule-based control model, but may be understood as a separate concept.

Here, the rule-based control model, the artificial neural network-based control model and the association rule-based control model may be stored in the memory 170 of the auto stop system control apparatus 100.

The artificial neural network-based control model stored in the memory 170 may be learned and stored through a running processor 130 of the auto stop system control apparatus 100, or may be learned through the running processor 240 of the learning apparatus 200 of the artificial neural network and received and stored through the wireless communication unit 110.

The processor 180 may periodically request update information of the artificial neural network-based control model from the learning device 200 of the artificial neural network when a set update time is reached, at the user's request, or at a request of the learning apparatus 200 of the artificial neural network. In addition, the processor 180 may receive the update information of the artificial neural network-based control model from the learning apparatus 200 of the artificial neural network and store the update information in a storage unit 170, and may determine the engine ignition timing or the engine ignition setting using the updated artificial neural network-based control model.

The rule-based control model is a model that mechanically determines the engine ignition timing or the engine ignition setting of the auto stop system according to a preset condition or rule for each of data items included in the base data.

Here, the rule-based control model may be a model of assigning a score according to whether a predetermined condition is met for each data item included in the base data, and determining the engine ignition timing or the engine ignition setting of the auto stop system based on the score of each data item.

Here, the processor 180 may determine the engine ignition timing or the engine ignition setting of the auto stop system in consideration of a score according to traffic volume information, a score according to a section distance, a score according to whether a green light is turned on, a score according to a remaining time of a currently turn-on signal, a score according to a distance to the preceding vehicle, a score according to whether a brake light of the preceding vehicle is turned on, using the rule-based control model.

For example, the processor 180 may assign a score of zero for the traffic volume information when current traffic volume is appropriate, a score of 1 for whether the green light is turned on when the green light is turned on, and a score of 0 for whether a brake light of the preceding vehicle is turned on when the brake light of the preceding vehicle is not turned on, weigh-sum the scores, and determine the engine ignition timing or the engine ignition setting of the auto stop system according to whether the weigh summed value exceeds a predetermined reference value.

Here, when the engine ignition setting is determined so as not to ignite the engine of the auto stop system when the weigh-summed value exceeds the predetermined reference value, a weight of the score according to the traffic volume information, a weight of the score according to whether the green light is turned on, a weight of the score according to whether the brake light of the preceding vehicle is turned on are set to be positive, and a weight of the score according to the distance to the preceding vehicle and a weight of the score according to the remaining time of a currently turn-on signal may be set to be negative. However, this is merely one example, and the sign of the weight for each score may be variously set according to implementations.

The association rule-based control model may be a model generated by an association rule analysis technique that analyzes a correlation between the base data corresponding to at least one of traffic information or vehicle driving information and the engine ignition timing or the engine ignition setting of the auto stop system.

The association rules are useful patterns expressed by condition-result expressions between items of data, and association rule analysis is a method of searching for associations between items included in an event, which includes finding out a frequent item set that is a set of items each having an event support equal to or higher than the minimum support and generating association rules therefrom. In this specification, a general description for the association rule analysis is omitted.

Here, the association rules may be generated by analyzing distribution of at least one item among traffic information or driving information of the vehicle, and identifying a frequency of simultaneous occurrence for each type.

The association rule-based control model may mean association rules based on analysis of association rules.

The artificial neural network-based control model may be a model composed of artificial neural networks learned to infer the engine ignition timing or the engine ignition setting of the auto stop system as a target feature (or output feature) using training data having the same format as the base data as input data.

The training data used for learning of the artificial neural network-based control model is labeled with the engine ignition timing or the engine ignition setting of the auto stop system, the artificial neural network-based control model may be learned through the supervised learning using the labeled training data.

For example, the training data may include information about a given environment (including at least one of traffic information or driving information) and information on the engine ignition timing or the engine ignition setting of an auto stop system suitable for the environment. The artificial neural network-based control model may be learned to accurately infer the engine ignition timing or the engine ignition setting of the labeled auto stop system from the information on the given environment.

In this case, a loss function (cost function) of the artificial neural network-based control model may be expressed by the squared average of a difference between the label for the engine ignition timing or the engine ignition setting of the auto stop system corresponding to each training data and the engine ignition timing or the engine ignition setting of the auto stop system inferred from the each training data. In addition, in the artificial neural network-based control model, model parameters included in the artificial neural network may be determined to minimize a cost function through learning.

That is, the artificial neural network-based control model is an artificial neural network model supervised using training data including training information (including at least one of traffic information and driving information) and corresponding labeled engine ignition timing or labeled engine ignition setting. The artificial neural network-based control model is learned to, when the input feature vector is extracted from the training information and inputted, output a result of the determination for the engine ignition timing or engine ignition setting as a target feature vector, and minimize a loss function corresponding to the difference between the output target feature vector and the label of the training data.

Here, the target feature of the artificial neural network-based control model may be composed of an output layer of a single node representing the engine ignition timing or engine ignition setting of the auto stop system. The target feature may have a value of "1" when the engine ignition setting indicates that the engine is ignited and a value of "0" when the engine ignition setting indicates that the engine is not ignited. The output layer of the artificial neural network-based control model may use sigmoid, hyperbolic tangent (tan h), or the like as an activation function.

Tables 3 and 4 below show examples of training data used for learning of the artificial neural network-based control model.

TABLE 3

|  | Training data 1 | Training data 2 | Training data 3 |
|---|---|---|---|
| Section(m) | 50 | 30 | 25 |
| Traffic volume information(0~1) | smooth(0) | slow(0.5) | 0.7 |
| Whether green light is turned on(0 or 1) | 1 | 0 | 1 |
| Remaining time of the currently turn-on signal(s) | 20 | 10 | 15 |
| Distance to preceding vehicle(m) | 40 | 20 | 15 |
| Whether brake light of preceding vehicle is turned on(0 or 1) | 0 | 1 | 0 |
| Brake pedal input strength | 0.5 | 0.9 | 0.9 |
| Pedal section information | 0.5(fine braking section) | 0(pedal play section) | 1(rapid braking section) |
| Current velocity(km/h) | 0 | 0 | 10 |
| Engine ignition timing(s) | 0 | 10 | 7 |

TABLE 4

|  | Training data 4 | Training data 5 | Training data 6 |
|---|---|---|---|
| Section(m) | 50 | 30 | 25 |
| Traffic volume information(0~1) | smooth(0) | slow(0.5) | 0.7 |
| Whether green light is turned on(0 or 1) | 1 | 0 | 1 |
| Remaining time of the currently turn-on signal(s) | 20 | 10 | 15 |
| Distance to preceding vehicle(m) | 40 | 20 | 15 |
| Whether brake light of preceding vehicle is turned on(0 or 1) | 0 | 1 | 0 |
| Brake pedal input strength | 0.5 | 0.9 | 0.9 |
| Pedal section information | 0.5(fine braking section) | 0(pedal play section) | 1(rapid braking section) |
| Current velocity(km/h) | 0 | 0 | 10 |
| Engine ignition setting(0 or 1) | 1 | 0 | 0 |

Table 3 shows an example of the training data of which the label is an engine ignition timing, and Table 4 shows an example of the training data of whether the label is an engine ignition setting.

In particular, since each training data includes only traffic information and driving information at one time point in Table 3 and Table 4, the training data may be included even in a state where the vehicle is not stopped.

Here, the engine ignition setting in the state where the vehicle is not stopped in the training data may be set to 0 uniformly. In this case, since the engine does not need to be ignited when the vehicle is not stopped, the engine ignition setting may mean whether to attempt ignition of the engine.

In addition, the engine ignition timing when the vehicle is not stopped may be obtained from the training data accumulated in time series, with respect to training data, which means a time point at which the engine is ignited in a state in which the vehicle is stopped after the training data in the unstopped state is collected.

Here, the processor 180 inputs the base data to the artificial neural network-based control model, obtains a target feature indicating the engine ignition timing or the engine ignition setting of the auto stop system from the input base data using the artificial neural network-based control model, and determine the engine ignition setting of the auto stop system based on the obtained target feature.

The processor 180 may extract an input feature vector suitable for input of the artificial neural network-based control model from the based data in the process of inputting the base data to the artificial neural network-based control model. However, since the base data obtained in step S303 actually means a feature vector extracted for use as input data of the artificial neural network-based control model, a separate feature vector may not be extracted.

That is, in step S303, the process of representing the non-digitized information by acquiring numerical information when acquiring the base data and normalizing and representing the digitized information may be a feature point extraction process to be used as the input data of the artificial neural network-based control model.

The processor 180 of the auto stop system control apparatus 100 determines whether the determined engine ignition timing has arrived or whether the determined engine ignition setting represents ignition (S307).

As a result of the determination in step S307, when the determined engine ignition timing has arrived or the determined engine ignition setting represents ignition, the processor 180 ignites the engine (S309) and outputs engine ignition information (S311).

Igniting the engine means that the engine is ignited while the engine is stopped automatically when the vehicle is stopped due to the auto stop system.

Here, when the processor 180 is an electronic control unit of the vehicle, the processor 180 may perform control to directly ignite the engine.

When the processor 180 is configured separately from the electronic control unit of the vehicle, the processor 180 may transmit a control signal for igniting the engine to the electronic control unit of the vehicle through the wireless communication unit 110 or the interface unit 160.

Here, the processor 180 may output engine ignition information through the output unit 150.

The engine ignition information may include information indicating that the engine has been ignited according to a determination result of the auto stop system control model even when the user does not take an action such as an action of taking his foot off the brake pedal or pressing the accelerator pedal to ignite the engine.

For example, the processor 180 may allow the display unit 151 to visualize that the engine is automatically ignited to output a message, an icon, or the like. In addition, the processor 180 may allow a sound output unit 152 to generate audible information notifying that the engine is automatically ignited to output a speech or warning sound. Here, the speech may include a pre-recorded guide speech, a mechanically synthesized speech, or the like.

In addition, the engine ignition information may include a notification requesting satisfaction or evaluation of the engine being automatically ignited.

As a result of the determination in step S307, when the determined engine ignition timing does not arrive or the determined engine ignition setting does not represent ignition, the processor 180 does not perform a separate operation.

Here, the processor 180 may obtain the user's feedback information on the determined engine ignition timing through the input unit 120.

The processor 180 may obtain the feedback information not only when a user speaks a feedback speech for the engine ignition timing intentionally determined or provides feedback information by pressing a feedback button, but also when the user unconsciously provides a response about the engine ignition timing unintentionally determined.

For example, the feedback information may be collected, such as a speech, such as "ignition is too slow" intentionally spoken by the user for feedback, evaluation information on the engine ignition timing, which is inputted through a touchable display or button, and speech (exclamation) of complaint unconsciously spoken by the user, or speech (exclamation) of satisfaction.

Here, the collected feedback information may be used to update the rule-based control model or the artificial neural network-based control model.

The collected feedback information may be used as labeling information for the engine ignition timing or the engine ignition setting.

Here, the processor 180 may store the pair of the feedback information and the base data corresponding to the feedback information in the memory 170.

The pair of base data and feedback information stored may be used to update the artificial neural network-based control model through the learning processor 130 or the running processor 240 of the learning apparatus 200 of the artificial neural network.

In this way, by determining the engine ignition timing or the engine ignition setting using the auto stop system control model updated by reflecting the user's satisfaction or preference, it is possible to control the individualized auto stop system having high satisfaction for each user.

In addition, the processor 180 may generate training data for update by adding a label for the engine ignition timing or the engine ignition setting to input data collected when the vehicle is driving.

Specifically, the processor 180 may obtain input data at predetermined intervals (for example, every 1 second) or in real time. The processor 180 may not able to determine the engine ignition timing or the engine ignition setting at the time at which the input data is collected. However, the processor 180 may determine the label of the specific input data for the engine ignition timing or the engine ignition setting in consideration of information on the time point at which the control for driving the vehicle for the first time after the collection of the corresponding input data is performed.

For example, assuming that input data is collected as shown in Table 5 below, the processor 180 may generate training data for update as shown in Table 6 below. Table 5 and Table 6 below show only the current velocity of the vehicle and the input of the brake pedal as information included in the input data to show an example of a method for generating training data for update, but the present invention is not limited thereto.

TABLE 5

| Input data | Collection time point | Current Velocity (km/h) | Brake pedal input strength (0~100) |
|---|---|---|---|
| Data 1 | 15:00:00 | 5 | 30 |
| Data 2 | 15:00:01 | 0 | 80 |
| Data 3 | 15:00:02 | 0 | 80 |
| Data 4 | 15:00:03 | 0 | 80 |
| Data 5 | 15:00:04 | 0 | 40 |
| Data 6 | 15:00:05 | 5 | 0 |
| Data 7 | 15:00:06 | 10 | 0 |
| Data 8 | 15:00:07 | 20 | 0 |
| Data 9 | 15:00:08 | 40 | 0 |

TABLE 6

| Training data for update | Collection time point | Current Velocity (km/h) | Brake pedal input strength (0~100) | Engine ignition timing(s) |
|---|---|---|---|---|
| Data 1 | 15:00:00 | 5 | 30 | 4 |
| Data 2 | 15:00:01 | 0 | 80 | 3 |
| Data 3 | 15:00:02 | 0 | 80 | 2 |
| Data 4 | 15:00:03 | 0 | 80 | 1 |
| Data 5 | 15:00:04 | 0 | 80 | 0 |
| Data 6 | 15:00:05 | 0 | 40 | 0 |
| Data 7 | 15:00:06 | 5 | 0 | (not determined) |
| Data 8 | 15:00:07 | 10 | 0 | (not determined) |

TABLE 6-continued

| Training data for update | Collection time point | Current Velocity (km/h) | Brake pedal input strength (0~100) | Engine ignition timing(s) |
|---|---|---|---|---|
| Data 9 | 15:00:08 | 30 | 0 | (not determined) |

Referring to Table 5 and Table 6, the input data was collected every 1 second, and according to the collected input data, the vehicle stopped at 15:00:01, and the input of the brake pedal began to decrease from 15:00:04 (or 15:00:05) as a control for driving the vehicle again, and the vehicle started driving again from 15:00:06.

The processor 180 finds out a time point at which control for driving the vehicle for the first time after each input data is collected is performed, and determines the engine ignition timing in consideration of the found time-point information. Therefore, since the control is performed to drive the vehicle again for the first time at 15:00:04 with respect to the input data 1 to the input data 5 collected between 15:00:00 and 15:00:04, the processor 180 may determine the engine ignition timing (or engine ignition setting) with 15:00:04 as reference with respect to the input data 1 to 5. In addition, since the input data 6 is collected at 15:00:05, and the control for driving the vehicle again is being performed, the processor 180 still determines the engine ignition timing (or engine ignition setting) with 15:00:04 as a respect with respect to the input data 6.

With respect to input data 7 to 9 collected after the vehicle 180 starts to drive again, the processor 180 may determine the engine ignition timing (or engine ignition setting) using the corresponding input data when input data on which control for driving the vehicle is performed is performed again is obtained, When the processor 180 generates training data for update from input data obtained while the vehicle is driving, the auto stop system control model may be updated by using the generated training data for update and the system control model updated may determine the engine ignition timing or the engine ignition setting with higher accuracy.

According to the present invention, the user may receive the auto stop system adequate for the current driving situation. Thus, this makes it possible to effectively solve the problem that the user's fatigue due to the operation of the auto stop system improperly increases, the fuel consumption is deteriorated, and the delay in departure after the stopping.

Figure 4:
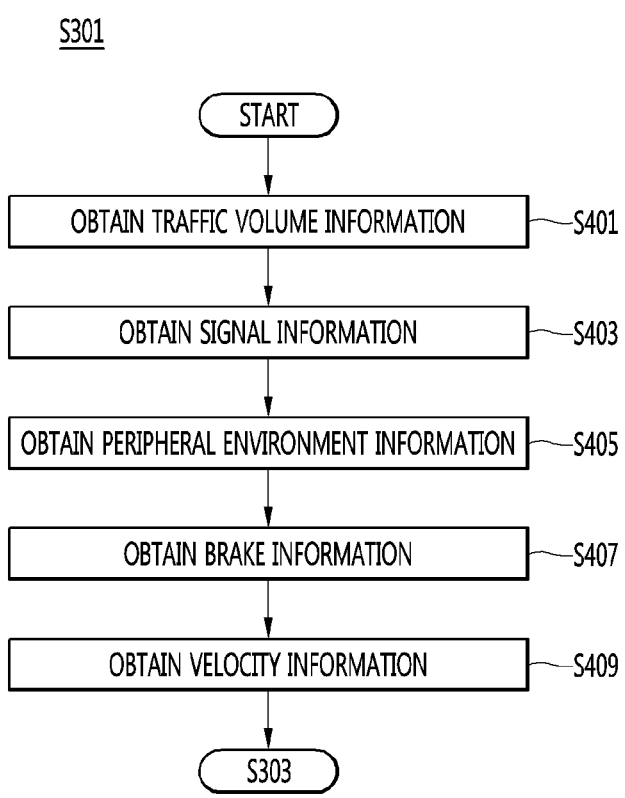
FIG. 4 is a flowchart illustrating an example of a step (S301) of obtaining input data illustrated in FIG. 3.

FIG. 4 is an operation flowchart illustrating an example of operation (S301) of obtaining input data illustrated in FIG. 3.

Figure 5:
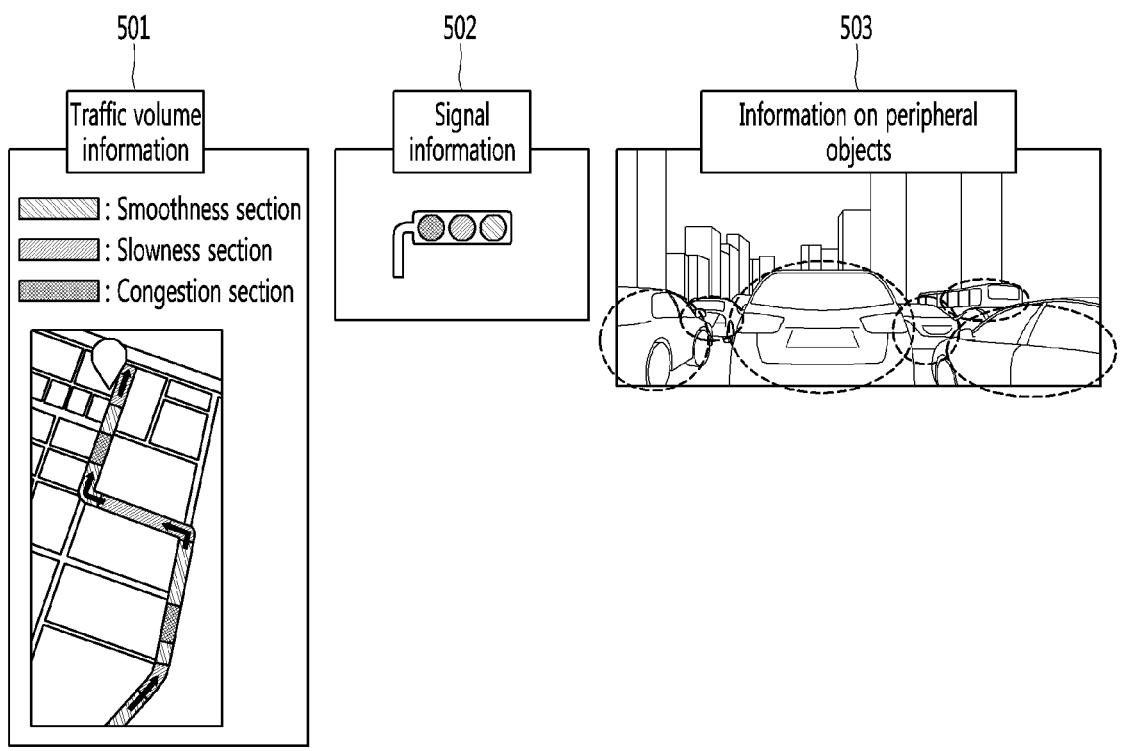
FIGS. 5 and 6 are views illustrating examples of input data obtained according to an embodiment of the present invention.

FIGS. 5 and 6 are views illustrating examples of input data obtained according to an embodiment of the present invention.

Referring to FIGS. 4 to 6, the processor 180 obtains traffic volume information 501 through at least one of the wireless communication unit 110, the input unit 120, or the interface unit 160 (S401).

The traffic volume information 501 may include information on the number of vehicles on a road, vehicle movement information, congestion degree information, travel time information, and the like.

Here, the obtained traffic volume information may mean traffic volume information for a road within a preset radius (for example, 200 meters) from the host vehicle, or may mean traffic volume information for a road on a driving route of the user currently set.

The processor 180 may obtain traffic volume information by analyzing at least one of the obtained image information or sound information.

Here, the processor 180 may receive and obtain traffic volume information from a navigation device/system.

The processor 180 obtains signal information 502 through at least one of the wireless communication unit 110, the input unit 120, or the interface unit 160 (S403).

The signal information 502 may include lighting information of a current signal (e.g., red light or green light), signal schedule information (e.g., a remaining time of a currently turn-on signal, or estimated lighting time of next green light), and the like.

The processor 180 may analyze at least one or more of the acquired image information or sound information to acquire the signal information.

The processor 180 may obtain signal information from another vehicle or a traffic data management device.

The processor 180 acquires peripheral environment information 503 through at least one or more of the wireless communication unit 110, input unit 120, or the interface unit 160 (S405).

The peripheral environment information 503 may be information on the peripheral object may include the number of peripheral objects, location information, motion information, and the like. That is, the peripheral environment information may include nearby vehicle information.

The nearby vehicle information may include the number of nearby vehicles, location information, motion information, driving information, and the like. Here, the driving information may include the nearby vehicle's moving line information, destination information, whether the brake light is turned on, whether the turn signal light is turned on, whether the emergency light is turned on, or the like.

Here, the processor 180 may analyze at least one or more of the acquired image information or sound information to acquire the peripheral environment information.

Here, the processor 180 may obtain surrounding environment information from another vehicle or the traffic data management device.

As described above, the traffic volume information 501, the signal information 502, and the surrounding environment information 503 may be obtained through various methods. In general, the traffic volume information 501 may be obtained from a navigation device/system, and the information 502 and the surrounding environment information 503 may be obtained from the image information.

The processor 180 obtains brake information 601 through at least one of the input unit 120 or the interface unit 160 (S407).

The processor 180 may receive brake information from the electronic control unit of the vehicle.

Here, the brake information may mean an input strength of the brake pedal collected continuously or periodically. The brake information may include time information (time stamp) for a time point when the input strength of the brake pedal is collected.

Here, the processor 180 may receive the input strength of the brake pedal in real time as the brake information. The received break information may be stored in the memory 170.

Here, the collected brake information includes information on the input strength of the brake pedal for each time zone, and is used to obtain the base data later.

The processor 180 obtains velocity information 602 through at least one of the input unit 120 or the interface unit 160 (S409).

Here, the processor 180 may receive the velocity information from the electronic control unit or navigation device of the vehicle.

The velocity information may mean the velocity of the vehicle continuously or periodically collected. The velocity information may include time information (time stamp) for a time point at which the velocity of the vehicle is collected.

Here, the processor 180 may receive the velocity of the vehicle in real time as the speed information. The received velocity information may be stored in the memory 170.

The collected velocity information includes information on the velocity of the vehicle for each time zone, and is used to obtain the base data later.

In an optional embodiment, the steps S401, S403, S405, S407, and S409 for obtaining input data may be performed in parallel with each other, or may be performed in a changed order.

FIG. 7 is a view illustrating an example of a rule-based control model according to an embodiment of the present invention.

Referring to FIG. 7, the rule-based control model may be a model for determining an engine ignition setting of the auto stop system using traffic volume information, signal information, and lighting information of a brake light of preceding vehicle.

For example, the rule-based control model may be a model for determining the engine ignition setting so as to ignite the engine only when the signal is green light and the brake light of the preceding vehicle is turned off in a case in which the traffic volume information indicates a "congestion" state. The rule-based control model may be a model for determining the engine ignition setting so as to ignite the engine when the brake light of the preceding vehicle is turned off regardless of the signal in a case in which the traffic volume information indicates a "slowness" state. The rule-based control model may be a model for determining the engine ignition setting so as to ignite the engine regardless of the brake light of the preceding vehicle when the signal is green and ignite the engine only when the brake light of the preceding vehicle is turned off when the signal is red in a case in which the traffic volume information indicates a "smoothness" state.

FIG. 7 shows merely an example of a rule-based control model that considers traffic volume information, signal information, and information on a brake light of a preceding vehicle in order to determine whether to ignite an engine, and the rule-based control model may be a model for differently determining whether to ignite an engine even using the same information according to various embodiments.

In addition, the rule-based control model may use a variety of information that is not limited to information such as traffic volume information, signal information, and information on the brake light of a preceding vehicle in order to determine whether to ignite the engine according to various embodiments.

The rule-based control model shown in FIG. 7 is a control model for determining an engine ignition timing, but may be a control model for determining the engine ignition timing according to various embodiments.

For example, the rule-based control model may be a model for setting an engine ignition timing to 0 seconds so as to ignite the engine immediately when the traffic volume information is "smoothness", the signal is green, and the brake light of a preceding vehicle is turned off and setting the engine ignition timing to 1 seconds so as to ignite the engine after 1 seconds when the traffic volume information is "congestion", the signal is green, and the brake light of the preceding vehicle is turned off.

FIG. 8 is a view illustrating an example of a format of data used for an associative rule analysis according to an embodiment of the present invention.

FIG. 9 is a view illustrating an example of an associative rule generated depending on the associative rule analysis according to an embodiment of the present invention.

Referring to FIGS. 8 and 9, in one embodiment of the present invention, the data used in the associative rule analysis may include traffic information for a specific situation and control information of the auto stop system suitable for the situation.

For example, data used for the association rule analysis may include information at a current time point and information at a past time point (such as a first previous time point), and may include at least one of traffic volume information, signal information, a velocity of a vehicle, or a velocity of a preceding vehicle.

Here, the data used for the association rule analysis may mean the above-described base data. Accordingly, items that are not expressed numerically among the items included in the input data may be digitized and may be expressed as discrete representative values (e.g., 0, 0.5, 1, or the like) or real values within a continuous range.

The input data may include traffic information, driving information, and user feedback as to an engine ignition timing or engine ignition setting in the situation.

The user feedback may be composed of explicit commands (e.g., "engine ignition after 1 second" or "engine non-ignition") as to the engine ignition timing or the engine ignition setting in a specific situation, and may also be composed of satisfaction feedback (e.g., "engine ignition is too late" or "I don't like this engine ignition") as to the engine ignition timing or the engine ignition setting determined in the association rule-based control model.

When the user feedback is composed of satisfaction feedback as to the engine ignition timing or the engine ignition setting determined by the association rule-based control model, the user feedback may include the engine ignition timing or engine ignition setting that is the target of the satisfaction feedback together.

The association rules generated according to the association rule analysis may be referred to as association rule-based control models, and as shown in FIG. 9, a correlation between traffic information and information on engine ignition timing or engine ignition setting of the auto stop system which is suitable therefor may be provided.

Figure 10:
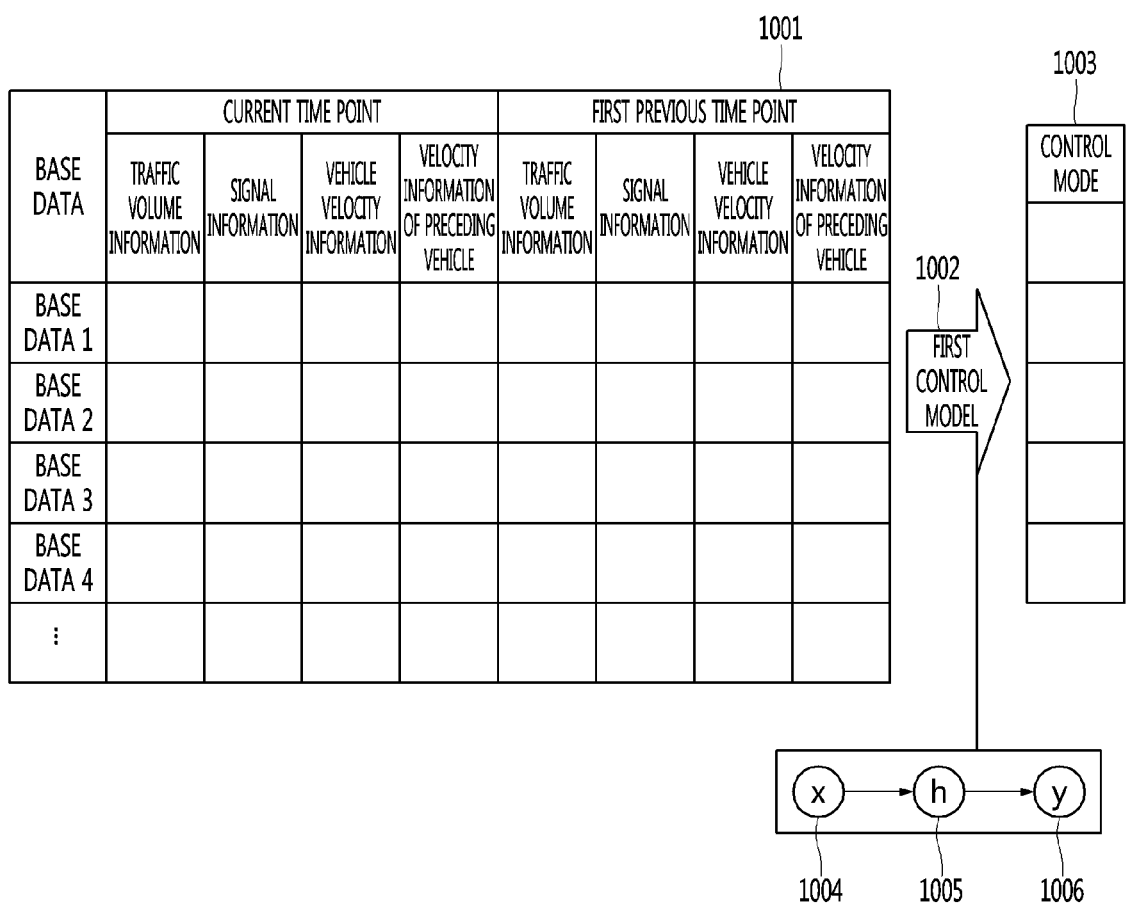
FIG. 10 is a view illustrating an example of an artificial neural network-based control model according to an embodiment of the present invention.

FIG. 10 is a view illustrating an example of an artificial neural network-based control model according to an embodiment of the present invention.

Referring to FIG. 10, an auto stop system control model according to an embodiment of the present invention may be an artificial neural network-based control model, and may be a multilayer neural network supervised using first training data. Hereinafter, it may be referred to as a first artificial neural network-based control model or a first model 1002.

Specifically, the first model 1002 is an artificial neural network having a multilayer structure. The first model 1002 may be learned using the first training data including traffic information and driving information 1001, and corresponding labeled engine ignition timing or labeled engine ignition setting 1003.

When the input feature extracted from the input data or the base data is inputted to an input layer 1004, the first model 1002 may be a model of outputting the engine ignition timing or the engine ignition setting as an output feature in an output layer 1006 via the one or more hidden layers 1005.

Although the input layer 1004, the hidden layer 1005, and the output layer 1006 are briefly shown as circles in FIG. 10, each of the layers may include a plurality of nodes and in particular, the hidden layer 1005 may include one or more hidden layers.

Here, the first model 1002 may receive input data or base data including at least one of traffic volume information, signal information, driving information of the vehicle, or driving information of a preceding vehicle. In addition, the first model 1002 may receive input data or base data including not only the information at the current time point but also information at a predetermined previous time point.

For example, the input data of the first model 1002 may include current traffic volume information, traffic volume information at a first previous time point, traffic volume information at a second previous time point, current signal information, signal information at the first previous time point, signal information at the second previous time point, current vehicle driving information, vehicle driving information at the first previous time point, vehicle driving information at the second previous time point, current driving information of the preceding vehicle, driving information of the preceding vehicle at the first previous time point, or driving information of the preceding vehicle at the second previous time point.

Here, the driving information of the preceding vehicle may include at least one or more of a velocity of the preceding vehicle, whether the brake light of the preceding vehicle is turned on, or a distance to the preceding vehicle.

The previous time point may be a predetermined previous time point, for example, the first previous time point may be set to a time point earlier than the current time point by 1 second, and the second previous time point may be set to a time point earlier than the current time point by 5 seconds.

In the above example, two pieces of previous time point information of the first previous time point and the second previous time point are included, but the number of previous time points included in the input data or the base data is not limited to two in the present invention.

As the input data or the base data itself includes not only current information but also information at previous time points, it is possible to determine the engine ignition timing or the engine ignition setting by considering information at the previous time points as well as at the current time point using an artificial neural network-based control model composed of a conventional multilayer neural network rather than a recurrent neural network.

Figure 11:
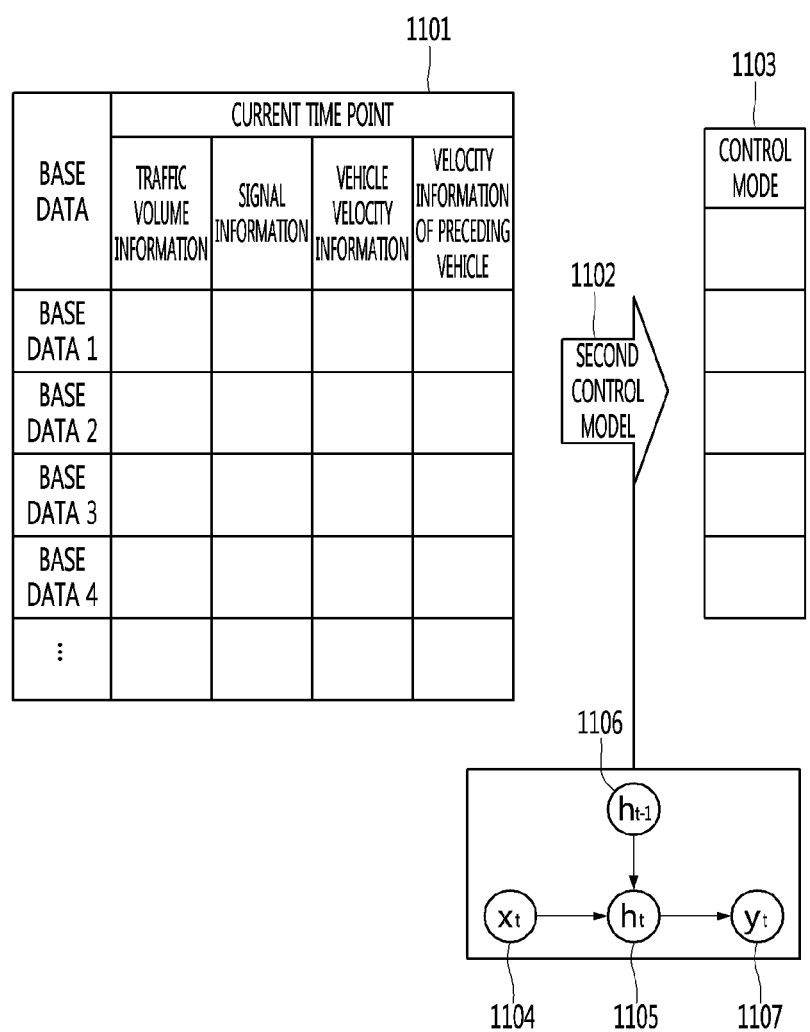
FIG. 11 is a view illustrating an example of an artificial neural network-based control model according to an embodiment of the present invention.

FIG. 11 is a view illustrating an example of an artificial neural network-based control model according to an embodiment of the present invention.

Referring to FIG. 11, an auto stop system control model according to an embodiment of the present invention may be an artificial neural network-based control model, and may be a recurrent neural network supervised using second training data. Hereinafter, it may be referred to as a second artificial neural network-based control model or a second model.

Figure 12:
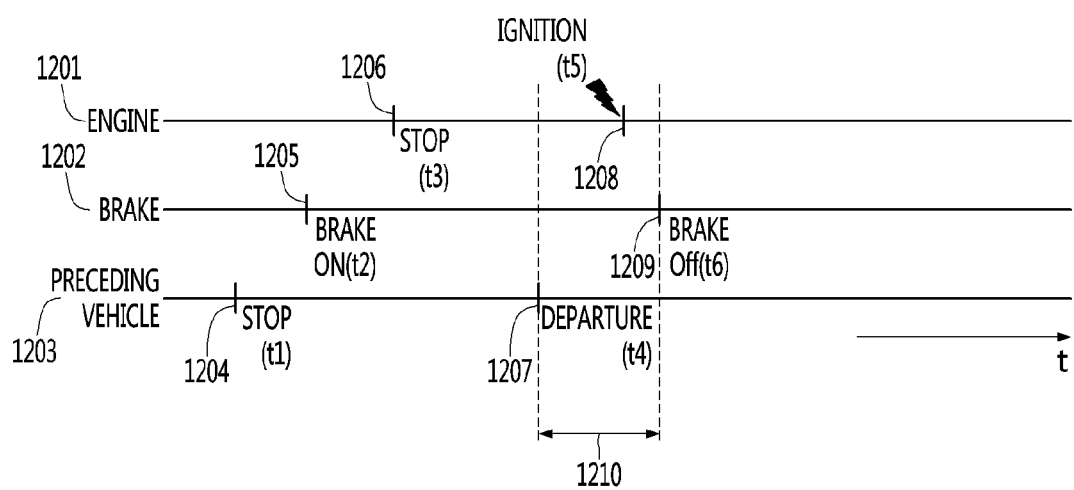
FIG. 12 is a view illustrating an example of a control scenario of an auto stop system according to an embodiment of the present invention.

Here, the recurrent neural network is a kind of artificial neural network having an advantage in processing time-continuous information by having a recurrent structure in which the output of the hidden layer is input to the hidden layer again as shown in FIG. 12.

That is, as nodes (neurons) of the hidden layer receive the output of the hidden layer at the previous time point in a specific time step, values owned by the nodes of the hidden layer are affected by values of the nodes of the hidden layer in the past. In this aspect, the hidden layer may be regarded as a memory for storing a value at a previous time point, and thus, the nodes of the hidden layer may be referred to as memory cells.

In addition, the second model 1102 may be implemented not only with a conventional recurrent neural network, but also with a long short term memory (LSTM) or a gated recurrent unit (GRU) derived therefrom, and a detailed description thereof will be omitted.

Specifically, the second model is a recurrent neural network 1102, which may be learned using second training data including traffic information and driving information 1101, and a corresponding labeled engine ignition timing or labeled engine ignition setting 1103.

The input layer 1104 of the second model 1102 receives an input feature extracted from the input data or base data.

The hidden layer 1105 of the second model 1102 generates an output from a value transferred from the input layer 1104 and a value transferred from the hidden layer 1106 at a previous time point and transfers it to the output layer 1107.

The output layer 1107 of the second model 1102 may output an engine ignition timing or the engine ignition setting as an output feature.

Although the input layer 1104, the hidden layers 1105 and 1106, and the output layer 1107 are briefly shown as circles in FIG. 11, each of the layers may include a plurality of nodes and in particular, the hidden layers 1105 and 1106 may include one or more hidden layers.

Here, the second model 1102 may receive input data or base data including at least one of traffic volume information, signal information, driving information of the vehicle, or driving information of a preceding vehicle. In addition, unlike the first model 1002, the second model 1102 may receive input data or base data including only information at the current time point. The reason for this is that the second model is a model capable of analyzing time-series data in consideration of previous time points even when only data at the corresponding time point is inputted at each time point due to the structural characteristics of the recurrent neural network.

For example, the input data of the second model 1102 may include current traffic volume information, current signal information, current vehicle driving information, and current driving information of the preceding vehicle.

Here, the driving information of the preceding vehicle may include at least one or more of a velocity of the preceding vehicle, whether the brake light of the preceding vehicle is turned on, or a distance to the preceding vehicle.

As described above, by using a model composed of a recurrent neural network, it is possible to effectively analyze traffic information or driving information collected continuously or periodically to determine the engine ignition timing or engine ignition setting suitable for a user.

FIG. 12 is a view illustrating an example of a control scenario of an auto stop system according to an embodiment of the present invention.

FIG. 12 shows a simplified example of a control scenario of an auto stop system for determining an engine ignition timing or engine ignition setting by considering only driving information of a preceding vehicle.

When a preceding vehicle 1203 stops at time point t1 (1204), a brake 1202 is activated at time point t2 by the user's operation or a system operation (1205), and thus the vehicle is stopped and an engine 1201 is stopped at time point t3 (1206).

Here, it is assumed that, when the preceding vehicle departs again at time point t4 (1207), the brake is deactivated at time point t6 by the user's operation or the system operation (1209).

In this case, in a typical auto stop system, the engine remains stopped for a period 1210 from t4 to t6. However, according an embodiment of the present invention, the engine is ignited at a specific time point t5 within the period 1210 of from t4 to t6 (1208). Therefore, according to the present invention, even when a brake pedal is continuously pressed, the vehicle may be prepared to immediately drive by igniting the engine when it is expected to drive again.

When to ignite the engine may be determined according to the engine ignition setting or the engine ignition timing determined in the auto stop system control model within the period 1210 of from t4 to t6.

For example, when the auto stop system control model determines to ignite the engine at any time point (e.g., t7) within the period 1210 of from t4 to t6, the engine may be ignited at the time point t7.

Alternatively, the engine may be ignited according to two methods when the auto stop system control model determines the engine ignition timing of the engine at a certain time point later than the current time point by 0.5 second within the period 1210 of from t4 to t6 (e.g., t8). According to the first method, the engine may be ignited after 0.5 seconds (t8+0.5 seconds). In the second method, after 0.5 seconds (t8+0.5 seconds), the engine ignition timing determined in the auto stop system control model is identified again, and whether to ignite may be determined as a result thereof.

The processor 180 may determine the engine ignition timing using the auto stop system control model in real time or periodically. It is assumed that the auto stop system control model determines the engine ignition timing 2 seconds later at a specific time point t9, and the processor 180 determines the engine ignition timing using the auto stop system control model every 1 second. In this case, the processor may determine the engine ignition timing again using the auto stop system control model one second later (t9+1 second), and when it is determined that the engine is to be ignited after 0.5 seconds as a result, ignite the engine 0.5 seconds later (t9+1.5 seconds).

According to an embodiment of the present invention, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

The above-described AI apparatus is not applied to be limited to the configuration and method of the above-described embodiments and may be configured by selectively combining all or some of the embodiments so that the embodiments are variously modified.

What is claimed is:

1. An artificial intelligence apparatus for controlling an auto stop function, comprising:
    an input unit configured to receive at least one of image information on surroundings of a vehicle, sound information on the surroundings of the vehicle, brake information of the vehicle, or velocity information of the vehicle;
    a storage unit configured to store an auto stop function control model; and
    a processor configured to:
        obtain, via the input unit, input data related to at least one of traffic information or driving information,
        obtain base data used for determining control of the auto stop function from the input data,
        determine an engine ignition timing or an engine ignition setting using the base data and the auto stop function control model, and
        ignite the engine of the vehicle automatically according to the determined engine ignition timing or the determined of engine ignition setting,
    wherein the engine ignition timing is an indication of how much time is required for the engine to be ignited after the input data is obtained or after the time of the determination, and
    wherein the engine ignition setting is an indication of whether to ignite the engine at the time of acquiring the input data or at the time of the determination.

2. The artificial intelligence apparatus of claim 1, wherein the auto stop function control model is a personalized model that is individually set for each vehicle or each user.

3. The artificial intelligence apparatus of claim 2, wherein the processor is configured to obtain the input data in real time or at predetermined intervals, and determine the engine ignition timing or the engine ignition setting only when the vehicle is stopped and the engine is stopped by the auto stop function.

4. The artificial intelligence apparatus of claim 3, wherein the processor is configured to:
    store the obtained input data in the storage unit,
    generate training data for update by using the stored input data by adding a label for the engine ignition timing or the engine ignition setting to each input data, and
    determine the label of the each input data in consideration of time when the each input data is collected or time when control for driving the vehicle again is performed first after the time when the each input data is collected.

5. The artificial intelligence apparatus of claim 2, further comprising:
    an output unit including at least one of a display or a speaker,
    wherein the processor is configured to output, via the output unit, the engine ignition information associated with the determined engine ignition timing or the determined engine ignition setting.

6. The artificial intelligence apparatus of claim 5, wherein the engine ignition information includes at least one of information indicating that the engine of the vehicle is automatically ignited by control of the processor or information requesting evaluation of the control of automatically igniting the engine of the vehicle.

7. The artificial intelligence apparatus of claim 2, wherein the auto stop function control model is a rule-based control model for determining the engine ignition timing or the engine ignition setting, according to whether rules or conditions for respective items of the base data are satisfied.

8. The artificial intelligence apparatus of claim 2, wherein the auto stop function control model is an artificial neural network-based control model learned by supervised learning, using training data including training traffic information, training driving information and corresponding labeled engine ignition timing or labeled engine ignition setting, and
    wherein the artificial neural network-based control model is learned such that, when an input feature vector is inputted, which is extracted from the training traffic information and the training driving information and, a determination result for the engine ignition timing or the engine ignition setting is output as a target feature vector, and a loss function corresponding to a difference between the outputted target feature vector and the labeled engine ignition timing or the labeled engine ignition setting.

9. The artificial intelligence apparatus of claim 8, wherein the artificial neural network-based control model is learned in an external artificial neural network learning device, or is learned through a learning processor that performs artificial neural network learning, and wherein, if the artificial neural network-based control model is trained in the learning device, the processor is configured to request and receive update information of the artificial neural network-based control model from the learning device when a user's request is received, a set update period is reached, or an update notification is received from the learning device, and update the artificial neural network-based control model using the received update information.

10. The artificial intelligence apparatus of claim 9, wherein the processor is configured to:

obtain, via the input unit, the user's feedback on the determined engine ignition timing or the determined engine ignition setting, and generate training data for update including the obtained feedback and the input data corresponding to and the feedback for use in updating the auto stop function control model.

11. The artificial intelligence apparatus of claim 10, wherein the feedback includes at least one of information on whether the engine ignition by the processor is at a suitable, early or late time; information on whether the engine ignition is satisfied; or an instruction to control ignition of the engine.

12. The artificial intelligence apparatus of claim 10, wherein the artificial neural network-based control model is learned by additionally reflecting the training data for update.

13. The artificial intelligence apparatus of claim 2, wherein the input data includes at least one of traffic information, signal information, surrounding environment information, and vehicle driving state information.

14. A method for controlling an auto stop function, comprising:

obtaining, by a processor, input data related to at least one of traffic information and driving information through an input unit that receives at least one of image information on surroundings of a vehicle, sound information on the surroundings of the vehicle, brake information of the vehicle, or velocity information of the vehicle;

obtaining, by the processor, base data used for determination of control of an auto stop function from the input data;

determining, by the processor, an engine ignition timing or an engine ignition setting using the base data and an auto stop function control model; and igniting the engine of the vehicle automatically according to the determined engine ignition timing or the determined engine ignition setting, wherein the engine ignition timing is an indication of how much time is required for the engine to be ignited after the input data is obtained or after the time of the determination, and wherein the engine ignition setting is an indication of whether to ignite the engine at the time of acquiring the input data or at the time of the determination.

15. A recording medium having a program recorded thereon for performing a control method for controlling an auto stop function, wherein the control method comprises:

obtaining, by a processor, input data related to at least one of traffic information and driving information through an input unit that receives at least one of image information on surroundings of a vehicle, sound information on the surroundings of the vehicle, brake information of the vehicle, or velocity information of the vehicle;

obtaining, by the processor, base data used for determination of control of an auto stop function from the input data;

determining, by the processor, an engine ignition timing or an engine ignition setting using the base data and an auto stop function control model; and igniting the engine of the vehicle automatically according to the determined engine ignition timing or the determined engine ignition setting, wherein the engine ignition timing is an indication of how much time is required for the engine to be ignited after the input data is obtained or after the time of the determination, and wherein the presence or absence of engine ignition is an indication of whether to ignite the engine at the time of acquiring the input data or at the time of the determination.

* * * * *